(12) United States Patent
Kohlmann et al.

(10) Patent No.: US 11,403,815 B2
(45) Date of Patent: Aug. 2, 2022

(54) GRIDDING GLOBAL DATA INTO A MINIMALLY DISTORTED GLOBAL RASTER

(71) Applicant: Landmark Graphics Corporation, Houston, TX (US)

(72) Inventors: Fabian Kohlmann, Didcot (GB); Graham Baines, Abingdon (GB)

(73) Assignee: Landmark Graphics Corporation, Houston, TX (US)

(*) Notice: Subject to any disclaimer, the term of this patent is extended or adjusted under 35 U.S.C. 154(b) by 0 days.

(21) Appl. No.: 16/642,640

(22) PCT Filed: Dec. 28, 2017

(86) PCT No.: PCT/US2017/068626
§ 371 (c)(1),
(2) Date: Feb. 27, 2020

(87) PCT Pub. No.: WO2019/132906
PCT Pub. Date: Jul. 4, 2019

(65) Prior Publication Data
US 2021/0042995 A1 Feb. 11, 2021

(51) Int. Cl.
*G06T 17/05* (2011.01)
*G06T 7/187* (2017.01)
*G06T 3/40* (2006.01)

(52) U.S. Cl.
CPC ............ *G06T 17/05* (2013.01); *G06T 3/4038* (2013.01); *G06T 7/187* (2017.01)

(58) Field of Classification Search
None
See application file for complete search history.

(56) References Cited

U.S. PATENT DOCUMENTS 5,798,923 A * 8/1998 Laskowski .............. G06T 17/05
345/418
6,937,234 B1 8/2005 Long
(Continued)

FOREIGN PATENT DOCUMENTS

WO 2012028164 A2 3/2012
WO WO-2012028164 A2 * 3/2012 ............. G06T 17/05

OTHER PUBLICATIONS

Sahr, Kevin, Denis White, and A. Jon Kimerling. "Geodesic discrete global grid systems." Cartography and Geographic Information Science 30.2 (2003): 121-134.*

(Continued)

*Primary Examiner* — Yu Chen
(74) *Attorney, Agent, or Firm* — Delizio, Peacock, Lewin & Guerra

(57) ABSTRACT

Map projections necessarily distort the Earth's surface in some fashion as a result of the transformation to a coordinate system. However, different map projection systems can preserve some properties of geospatial data (e.g., area) at the expense of other properties (e.g., distance or azimuth). To produce a minimally distorted global raster, a global raster generator creates a number and variety of projections using as input geospatial data. The generator intelligently selects the projection systems based on properties of the input data and desired properties of an output global raster. The generator then applies interpolation algorithms to the projections to produce smooth and continuous projections. The generator then re-projects the interpolated projections to a desired output projection system and filters the projections to identify and remove regions of the projections which exhibit distortion. The generator merges the filtered projections which results in a minimally distorted global raster.

20 Claims, 8 Drawing Sheets

(56) References Cited

U.S. PATENT DOCUMENTS

| | | | | |
|---|---|---|---|---|
| 2008/0174593 A1* | 7/2008 | Ham | ................... | G06F 16/9574 |
| | | | | 345/418 |
| 2009/0123088 A1* | 5/2009 | Kallay | ................. | G06T 3/0062 |
| | | | | 382/295 |
| 2016/0196670 A1* | 7/2016 | Bak | ..................... | G06K 9/6201 |
| | | | | 345/441 |
| 2016/0350941 A1 | 12/2016 | Yu et al. | | |
| 2017/0006240 A1 | 1/2017 | Sron | | |
| 2017/0301065 A1* | 10/2017 | Adsumilli | ............... | G06T 5/001 |

OTHER PUBLICATIONS

Jenny, Bernhard, Bojan Šavrič, and Tom Patterson. "A compromise aspect-adaptive cylindrical projection for world maps." International Journal of Geographical Information Science 29.6 (2015): 935-952.*

Šavrič, Bojan, and Bernhard Jenny. "Automating the selection of standard parallels for conic map projections." Computers & Geosciences 90 (2016): 202-212.*

Jenny, Bernhard. "Adaptive composite map projections." IEEE Transactions on Visualization and Computer Graphics 18.12 (2012): 2575-2582.*

Sakshuwong, Sukolsak, and Gabor Angeli. "Adaptive Composite Map Projections in D3." (2015).*

Jenny, Bernhard, et al. "A guide to selecting map projections for world and hemisphere maps." Choosing a map projection. Springer, Cham, 2017. 213-228.*

Dennis, Michael L. "Ground truth: Low distortion map projections for engineering, surveying, and GIS." Pipelines 2016. 2016. 857-869.*

Jenny, Bernhard, and Bojan Šavrič. "Combining world map projections." Choosing a Map Projection. Springer, Cham, 2017. 203-211.*

Hradilek, Ludvik, and Angus C. Hamilton. A systematic analysis of distortions in map projections. Department of Surveying Engineering, University of New Brunswick, 1974.*

PCT Application Serial No. PCT/US2017/068626, International Search Report, dated Sep. 27, 2018, 3 pages.

PCT Application Serial No. PCT/US2017/068626, International Written Opinion, dated Sep. 27, 2018, 8 pages.

* cited by examiner

GRIDDING GLOBAL DATA INTO A MINIMALLY DISTORTED GLOBAL RASTER

FIELD

The disclosure generally relates to the field of image data processing and generation and more particularly to gridding global data into a minimally distorted global raster.

BACKGROUND

Map projections or grids are a transformation of the latitudes and longitudes of locations from the surface of a sphere or an ellipsoid into locations on a plane. This transformation process is often referred to as gridding or projecting data. Examples of map projections include Equirectangular, Cassini, Mercator, Gauss-Krüger, Lambert cylindrical equal-area, etc. Different map projections are able preserve some properties of the sphere-like body at the expense of other properties. Projections use a projected coordinate system (PCS) which is defined on a flat, two-dimensional surface. A PCS is based on a geographic coordinate system (GCS) which uses a three-dimensional spherical surface to define locations on the earth. A geographic coordinate system (GCS) uses a three-dimensional spherical surface to define locations on the earth. A GCS includes an angular unit of measure, a prime meridian, and a datum (based on a spheroid). The spheroid defines the size and shape of the earth model, while the datum connects the spheroid to the earth's surface. A point is referenced by its longitude and latitude values. Longitude and latitude are angles measured from the earth's center to a point on the earth's surface. The angles often are measured in degrees (or in grads). Unlike a GCS, a PCS has constant lengths, angles, and areas across the two dimensions. A PCS is based on a GCS that is based on a sphere or spheroid. In addition to the GCS, a PCS includes a map projection, a set of projection parameters that customize the map projection for a particular location, and a linear unit of measure.

BRIEF DESCRIPTION OF THE DRAWINGS

Embodiments of the disclosure may be better understood by referencing the accompanying drawings.

DESCRIPTION

Figure 1:
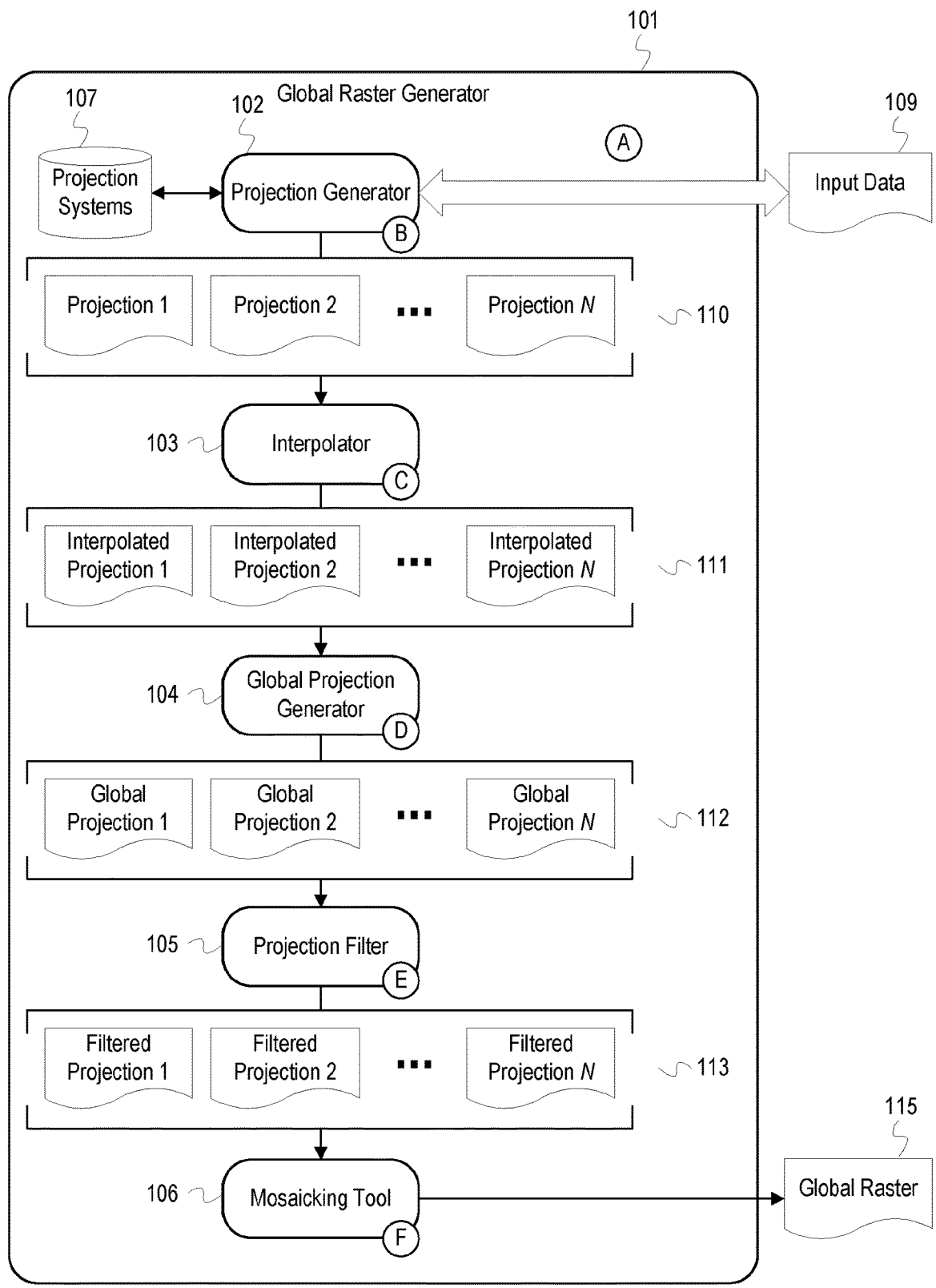
FIG. 1 is a block diagram depicting an example global data gridding system which produces smooth and continuous grids from global geospatial data.

The description that follows includes example systems, methods, techniques, and program flows that embody embodiments of the disclosure. However, it is understood that this disclosure may be practiced without these specific details. For instance, this disclosure refers to generating a minimally distorted global raster of earth in illustrative examples. Embodiments of this disclosure can be also applied to creating a minimally distorted raster for data projections on surfaces other than Earth, such as other astronomical surfaces or spherical bodies in general. In other instances, well-known instruction instances, protocols, structures and techniques have not been shown in detail in order not to obfuscate the description.

Overview

Map projections necessarily distort the Earth's surface in some fashion as a result of the transformation to a coordinate system. However, different map projection systems can preserve some properties of geospatial data (e.g., area) at the expense of other properties (e.g., distance or azimuth). To produce a minimally distorted global raster, a global raster generator creates a number and variety of projections using as input geospatial data. The generator intelligently selects the projection systems based on properties of the input data and desired properties of an output global raster. The generator then applies interpolation algorithms to the projections to produce smooth and continuous projections. The generator then re-projects the interpolated projections to a desired output projection system and filters the projections to identify and remove regions of the projections which exhibit distortion. The generator merges the filtered projections which results in a minimally distorted global raster. The resulting global raster may also be authalic depending on the output projection system utilized. Creating a minimally distorted, authalic global raster allows for analysis of geospatial data on a global scale, as opposed to other techniques which may require analyzing disparate regional sections for each area of interest. An authalic global raster is critical for some data analysis such as global paleoclimate modelling, global sequence stratigraphic modelling, and other geoscience modelling.

Terminology

The term "raster" as used herein refers to a raster graphic or image. A raster is a dot matrix data structure, representing a generally rectangular grid of pixels, or points of color, viewable via a monitor, paper, or other display medium. A global raster depicts an image of the earth with each pixel or cell representing an area or datum corresponding to a geographic location of earth. For example, a global raster can be used to display data relating to climate, population, elevation, formations, etc. The term "authalic" indicates that a map depicts an equal area as a reference model of earth. For example, authalic sphere is a spherical model of the Earth that has the same surface area as that of the reference ellipsoid.

Example Illustrations

FIG. 1 is a block diagram depicting an example global raster generator which produces smooth and continuous global raster from global geospatial data. FIG. 1 depicts a global raster generator 101 that includes a projection generator 102, an interpolator 103, a global projection generator 104, a projection filter 105, and a mosaicking tool 106. The projection generator 102 utilizes a library of projection systems 107.

At stage A, the projection generator 102 receives input data 109. The input data 109 is a geographical information system (GIS) file or data structure which contains geographical information or geospatial data. A GIS is a system designed to capture, store, manipulate, analyze, manage, and present spatial or geographic data. The data may be expressed in raster, vector, or grid formats and based on a projection system. The input data 109 can indicate a variety of information such as topographical data, paleoclimate data, hydrological data, etc. The input data 109 may include properties or metadata which indicate related geographic locations, compatible projection systems, etc.

At stage B, the projection generator 102 generates projections 110. The projection generator 102 retrieves or selects the desired projections from the projection systems 107. Projections systems uses projection mathematics (i.e., geometrical/geodetic transformations, equations, or other mathematical operations) to warp or transform three-dimensional data to a two-dimensional plane. Projections can also involve projection to different surfaces such as cylindrical, conical, azimuthal, etc. All map projections necessarily distort the earth's surface in some fashion during the transformation. However, different projection systems utilize different projection physics and may have different properties or functionality as a result. For example, different map projections are able to preserve some properties of the earth at the expense of other properties, different map projections experience distortion at different areas of the projection. The projection generator 102 can analyze the properties of the input data 109 to identify compatible projections in the projection systems 107 that are suitable for the input data 109. Additionally, the projection generator 102 may select projection systems which are known to produce distortion free projections for particular geographic locations indicated in the input data 109. For example, if the input data 109 is particularly relevant to polar regions, the projection generator 102 may select a Lambert Projection System which can produce relatively distortion free polar projections.

As shown in FIG. 1, the projections 110 include a configurable number of projections 1–N. The number of the projections 110 generated by the projection generator 102 varies based on desired output parameters or use cases. Generally, the greater number of projections generated the less distortion in the resulting global raster 115. So, in instances where some distortion is acceptable, the projection generator 102 may generate a lower number of projections, and in instances where high resolution or clarity is necessary, the projection generator 102 may generate a higher number of projections. For example, climate and weather data may not require a high resolution or low distortion output, whereas demographic data may require greater detail and less distortion. After selecting the type and number of projections from the projection systems 107, the projection generator 102 generates the projections 110 in accordance with the projection physics of each selected projection system.

At stage C, the interpolator 103 interpolates each of the projections 110 to generate the interpolated projections 111. Interpolation is a process that uses measured values taken at known sample locations to predict (estimate) values for unsampled locations. The interpolator 103 can use a variety of interpolation methods. The interpolation method used can differ based on underlying assumptions of an interpolation method, data requirements based on the input data 109, and capabilities to generate different types of output. The interpolator 103 may interpolate the projections 110 using cartesian gridding algorithms or geostatistical analysis techniques. Examples of cartesian gridding algorithms and geostatistical analysis techniques include nearest-neighbor, natural neighbor interpolation (based on Delauney triangulation), inverse distance weighting, linear interpolation, cubic splines (with and without barriers), minimum curvature (with and without tension), and kriging. If any of the projections 110 are based on a GCS, the interpolator 103 uses a gridding algorithm capable of gridding in spherical coordinates such as Delauney triangulation based spherical interpolation with tension or Green's function based interpolation.

At stage D, the global projection generator 104 uses the interpolated projections 111 to generate global projections 112. Each of the interpolated projections 111 are based on the original projection systems utilized by the projection generator 102 to generate the projections 110. The global projection generator 104 transforms or re-projects each of the interpolated projections 111 to a desired output projection. The desired output projection may be a projection based on a PCS or a GCS, which would result a three-dimensional projection. The global projection generator 104 may be configured with the desired output projection system or may determine a suitable output projection based on input parameters or properties of the input data 109.

At stage E, the projection filter 105 applies a filter to each of the global projections 112 to identify regions of the global projections 112 which contain minimal distortion. Distortion can refer to gridding errors, artefacts, or visual imperfections present in the global projections 112.

Distortion may be identified based on a visual inspection by a user who may select desirable regions or crop out distorted regions. Additionally, the projection filter 105 can measure distortion by determining a ratio between the map-distance (distance shown in a PCS) compared to the true angular distance in a GCS or determining changes in angles of Cardinal directions. Distortion is then measured based on a difference between the values and compared to a threshold. If the difference exceeds the threshold, then the region on the projection associated with the measured difference is determined to contain distortion. The value of the threshold can vary based on a target resolution. For example, differences of 10-20% may be satisfactory for a sparse system. Distortion may also refer to inaccuracies in the input data 109 or in the interpolated data. The data (both interpolated and input) in the global projections 112 may be validated using cross validation techniques and semivariogram functions, etc. Areas which indicate errors or large variance between measured and interpolated/predicted values may be filtered out from the global projections 112. The projection filter 105 outputs the filtered projections 113 which contain the regions determined to contain minimal distortion.

At stage F, the mosaicking tool 106 combines the filtered projections 113 to generate a global raster 115. The mosaicking tool 106 may combine or merge the filtered projections 113 using a variety of mosaicking algorithms including linear functions or cosine squared functions. In general, the process involves identifying geographic boundaries of regions in the filtered projections 113 and aligning the boundaries based on their geospatial information to generate a continuous image or raster. In areas in which the filtered projections 113 overlap, the mosaicking tool 106 can use feathering functions which can involve weighting data from each of the overlapping projections to generate a smooth image. During the mosaicking process, absolute values are conserved, such that the final spatial grid f(x) for the global raster 115 is a function of the input grids $g_i(x)$ (i=1, 2, ... n) such that:

$$f(x) = \sum_{i=1}^{n} w_i(x) \cdot g_i(x) \quad (1.1)$$

Where, $w_i(x)$ (i=1, 2, ... n) are the mosaicking functions such that:

$$\sum_{i=1}^{n} w_i(x) = 1 \quad (1.2)$$

After merging the filtered projections 113, the mosaicking tool 106 outputs the global raster 115.

Figure 2:
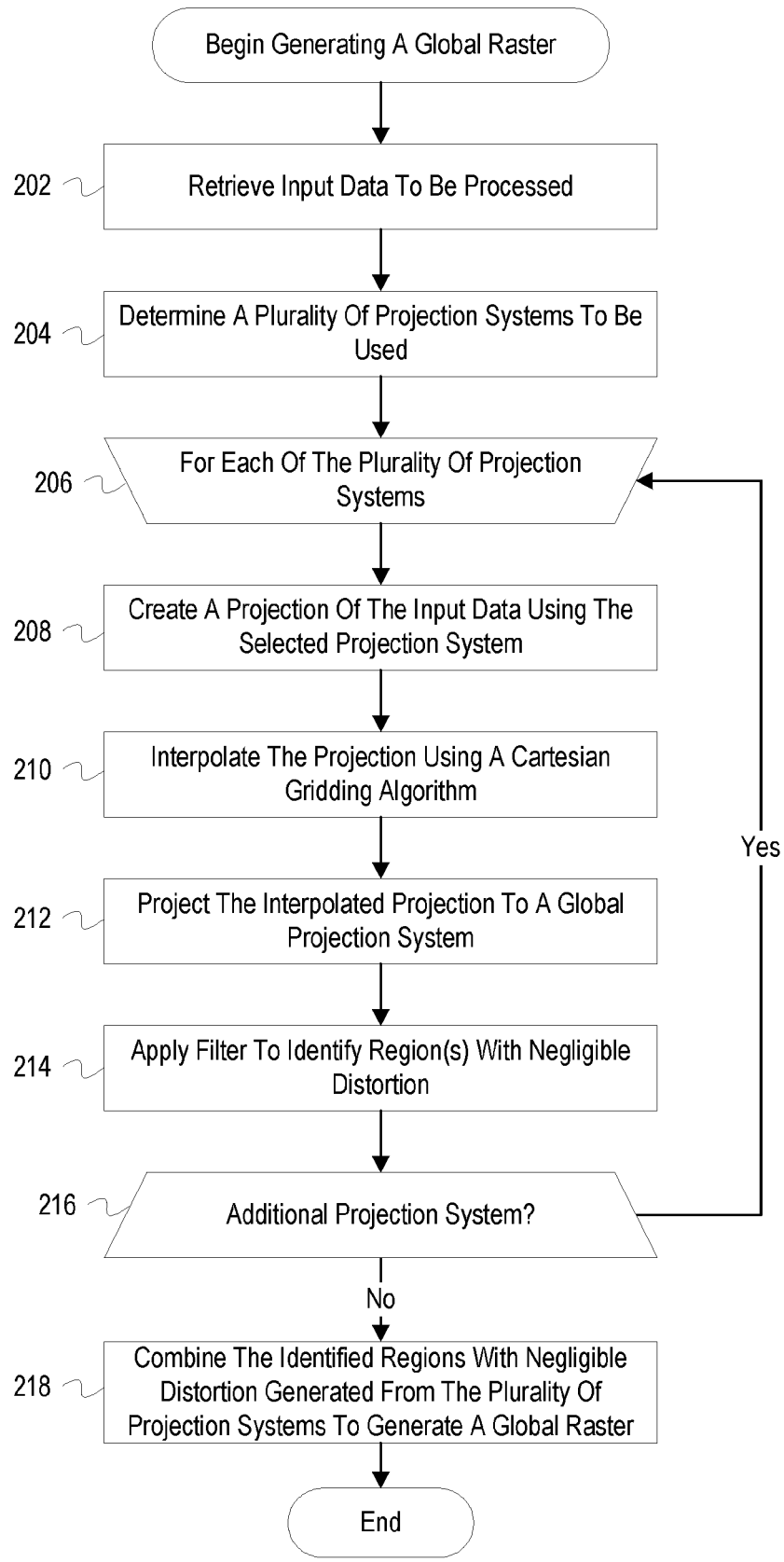
FIG. 2 is a flowchart depicting example operations for generating an authalic global raster.

FIG. 2 is a flowchart depicting example operations for generating an authalic global raster. FIG. 2 describes a global raster generator as performing the operations for naming consistency with FIG. 1, although naming of program code can vary among implementations.

At block 202, a global raster generator ("generator") retrieves input data to be processed. The input data can include subterranean formation data, information related to oil reserves, topographical information, etc. The generator may retrieve the data from sources on the Internet, through satellites, weather radars, etc. Additionally, the generator may receive real time data from a variety of deployed sensors within a region or area of interest. The generator may process the input data to identify properties of the data, geographical regions related to the data, etc. After retrieving the input data, control flows to block 204.

At block 204, the generator determines a plurality of projection systems to be used. The type and number of projections systems used can vary based on a desired level of resolution. After selecting a plurality of projection systems, control flows to block 206.

At block 206, the generator begins processing the input data in accordance with each of the plurality of projection systems. The generator iterates through each of the plurality of projection systems to perform the operations described below. The projection system currently being utilized is hereinafter referred to as "the selected projection system." After selecting a projection system, control flows to block 208.

At block 208, the generator projects the input data using the selected projection system. The generator projects the input data in accordance with the projection physics of the selected projection system. In other words, the generator warps or transforms the input data to be consistent with a PCS of the selected projection system. After projecting the input data, control flows to block 210.

At block 210, the generator interpolates the projection using a cartesian gridding algorithm. The generator may select a cartesian gridding algorithm based on a coordinate system of the selected projection system. For example, the selected projection system may utilize a Universal Transverse Mercator (UTM) PCS, so the generator selects a gridding algorithm that is compatible with the UTM PCS. After interpolating the projection, control flows to block 212.

At block 212, the generator projects the interpolated projection to a global projection system. The global projection system is the desired output projection on which the final global raster will be based. The desired output projection system may be input by a user or may be selected by the generator based on input parameters or the input data. For example, if the input data includes elevation data, the generator uses an output projection system suitable for displaying elevation data. As an additional example, if a user inputs a critical area of interest, the generator uses a projection system designed for the indicated area. After re-projecting the interpolated projection to a desired output projection, control flows to block 214.

At block 214, the generator applies a filter to identify regions with negligible distortion. The generator may receive input from a user who selects regions determined to have minimal distortion after visual inspection. Alternatively, the generator may algorithmically identify areas with minimal distortion based on measurements of differences between the input data and data indicated in the global projection system. In some implementations, the generator can apply thresholds related to the input data to identify distorted cells. For example, if the input data indicates elevations, the generator can ensure that no cells have unrealistic values, such as an elevation value higher than the highest point on earth or lower than the lowest point on earth. The generator may consider any cell which has a value that exceeds these thresholds as distorted.

The generator may mark the distorted cells in the global projection system. For example, the generator can create a graph data structure with a grid corresponding to the cells of the global projection system and indicate a 1 or a 0 for cells to keep or discard, respectively. Alternatively, the generator may mark the cells with values corresponding to the measured distortion. For example, if a cell has a measure distortion of 20%, the generator may mark the cell with a value of 0.2. Then, during the mosaicking process, if two filtered projections have overlapping cells, the generator can select the cell which exhibits the least amount of distortion. The result of applying the filter is a filtered projection in which desirable regions of the global projection system (i.e., regions with minimal distortion) remain and distorted regions are removed. After filtering the global projection, control flows to block 216.

At block 216, the generator determines if there is an additional projection system. If there is an additional projection system in the plurality of projection systems, the generator selects the next projection system and control flows to block 206. If there is not an additional projection system, control flows to block 218.

At block 218, the generator combines the identified regions generated from the plurality of projection systems to generate a minimally distorted global raster. The regions are combined using a mosaicking algorithm that conserves their absolute values (e.g. cosine squared filter). The regions may be loaded into memory of a computer system executing the generator for processing in accordance with the mosaicking algorithm. Overlapping regions may be feathered or otherwise filtered so that the resulting global raster presents a smooth continuous image. After combining the filtered regions, the process ends.

Figure 3:
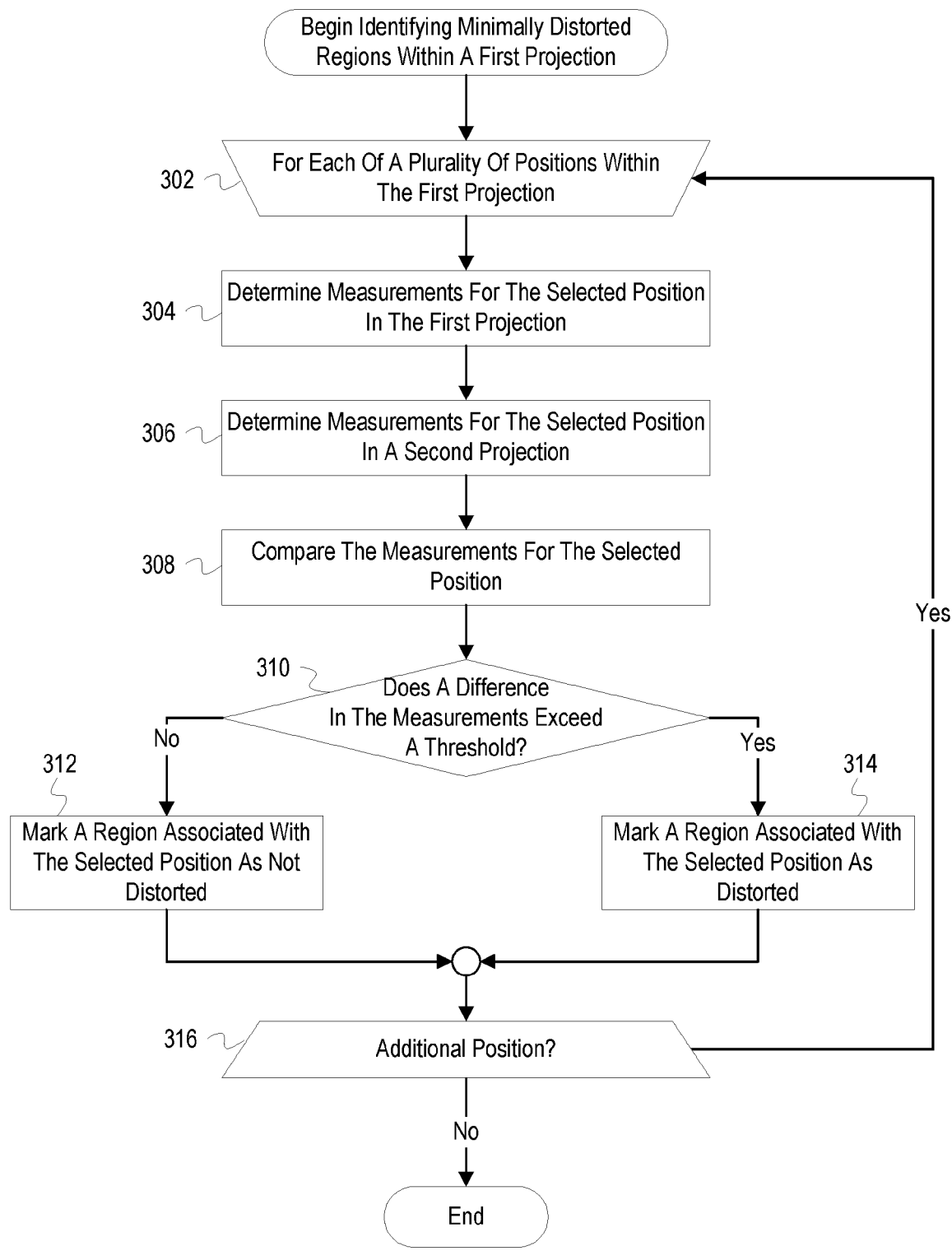
FIG. 3 is a flowchart depicting example operations for identifying minimally distorted regions in a projection.

FIG. 3 is a flowchart depicting example operations for identifying minimally distorted regions in a projection. FIG. 3 describes a global raster generator as performing the operations for naming consistency with FIG. 1, although naming of program code can vary among implementations. The operations of FIG. 3 may be performed during the operation of block 214 in FIG. 2.

At block 302, a global raster generator ("generator") begins measuring distortion at a plurality of positions within the first projection. The positions correspond to points or geographic coordinates within the first projection. The generator may randomly select positions within the first projection or may divide the first projection into regions and select a position from within each region. Additionally, the generator may select the positions to be locations within specified areas of interest in the first projection. The number of positions selected may be determined randomly or may be based on an indicated level of resolution for a final global raster. For example, if the final global raster is to be of a high resolution, the generator may analyze more positions versus a relatively low resolution. The position currently being analyzed by the generator is hereinafter referred to as the selected position.

At block 304, the generator determines measurements for the selected position in the first projection. The measurements are used to quantify the geographical location of the selected position for comparison to another projection system. The measurements may be a calculated distance from the selected position to one or more reference positions. For example, the generator can calculate the distances between the selected position and two other positions which are not co-linear. The generator can also measure an azimuth of the selected position with respect to a cardinal vector/direction within the first projection, e.g. north, east, south, or west. After determining the measurements within the first projection, control flows to block 306.

At block 306, the generator determines measurements for the selected position in a second projection. The generator determines the same measurements for the selected position within the second projection as were determined from the first projection. The second projection may be a reference projection which is known to be minimally distorted or may be a projection on which the first projection is based. For example, the first projection may be one of the global projections 112, and the second projection may be one of the interpolated projections 111, the projections 110, or a projection of the input data 109, as described in FIG. 1. The second projection may be based on a PCS or a GCS. If a GCS projection is used, the generator may calculate the measurements for the selected position in a different manner. For example, a true angular distance between the selected position and a reference position within the GCS may be calculated, as opposed to a linear distance within a PCS. After determining measurements within the second projection, control flows to block 308.

At block 308, the generator compares the measurements for the selected position. A difference in the measurements indicates that some level of distortion is present at the selected position. For example, if a measured distance in the first projection is different than a measured distance in the second projection, the generator determines that one of the projections is not accurately reflecting the distance and, therefore, determines that there is distortion at the selected position. The generator may calculate a percentage difference in the measurements or determine a value by which the measurements differ. After comparing the measurements, control flows to block 310.

At block 310, the generator determines whether a difference in the measurements exceeds a threshold. The threshold may be specified in parameters for generating the raster or may be determined from an indicated level of resolution for a final global raster. If the final global raster is to be of a low resolution, the threshold may be higher versus a high resolution. For example, a threshold difference of 20% may be specified for a low resolution, and a threshold difference of 5% may be specified for a high resolution. If the generator determines that the difference does not exceed the threshold, control flows to block 312. If the generator determines that the difference exceeds the threshold, control flows to block 314.

At block 312, after determining that the difference does not exceed the threshold, the generator determines that there is a minimal (or at least acceptable) level of distortion at the selected position and marks a region associated with the selected position as not distorted. For example, as described above, the generator may mark the region or cells within the region with a 1 indicating that the region should be retained for a final global raster. The region associated with the selected position may be an area calculated based on a radial distance around the selected position. If the generator previously divided the first projection into regions at block 302, then the region associated with the selected position is the region which encompasses the selected position. After marking the region as not distorted, control flows to block 316.

At block 314, after determining that the difference does exceed the threshold, the generator determines that there is an unacceptable level of distortion at the selected position and marks a region associated with the selected position as distorted. For example, as described above, the generator may mark the region or cells within the region with a 0 indicating that the region should not be retained for a final global raster. After marking the region as distorted, control flows to block 316.

At block 316, after marking a region associated with the selected position as distorted or not distorted, the generator determines if there is an additional position. If there is an additional position, the generator may select the next position for analysis from a list or may randomly select the next position. If there is not an additional position, the process ends.

Figure 4:
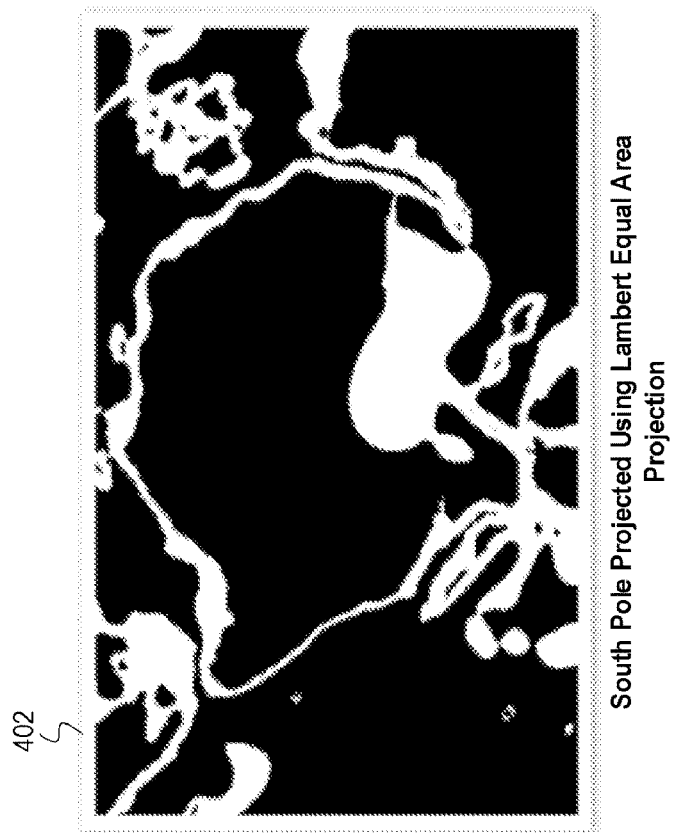
FIG. 4 is an illustration depicting example global data projections that exhibit distortion.
Figure 4:
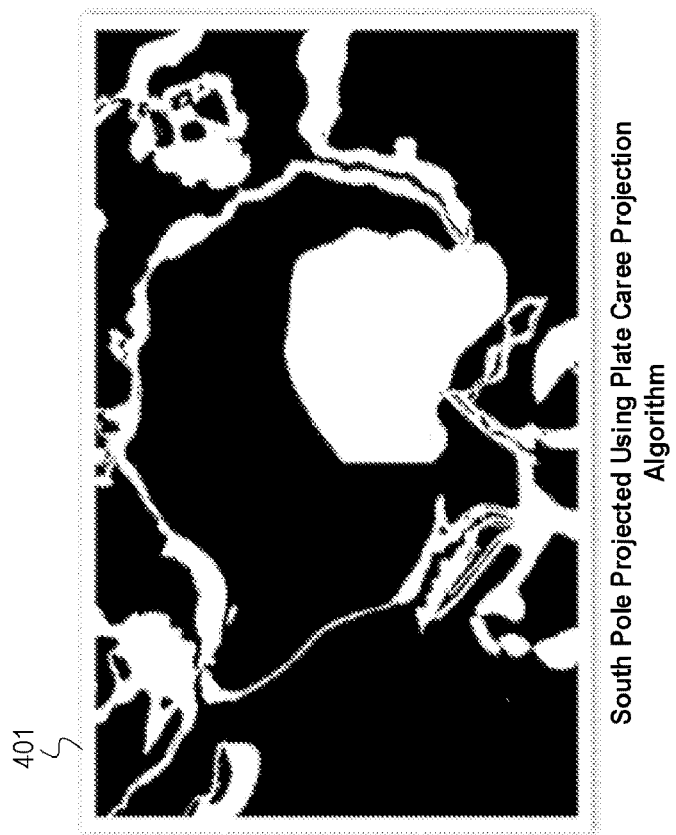

FIG. 4 is an illustration depicting example global data projections that exhibit distortion. FIG. 4 depicts a projection 401 and a projection 402. The projection 401 was generated using a projection system entitled World Geodetic System 1984 (WGS84) which was centered on the south pole. The projection 402 was generated using a projection system entitled Lambert Equal Area Projection and was similarly centered on the south pole. FIG. 4 is illustrative of the differences that can occur among different projection systems. For example, the region in the center of the projection 401 is noticeably different in comparison to the projection 402 based on the projection 401 exhibiting distortion around the center of the image.

Figure 5:
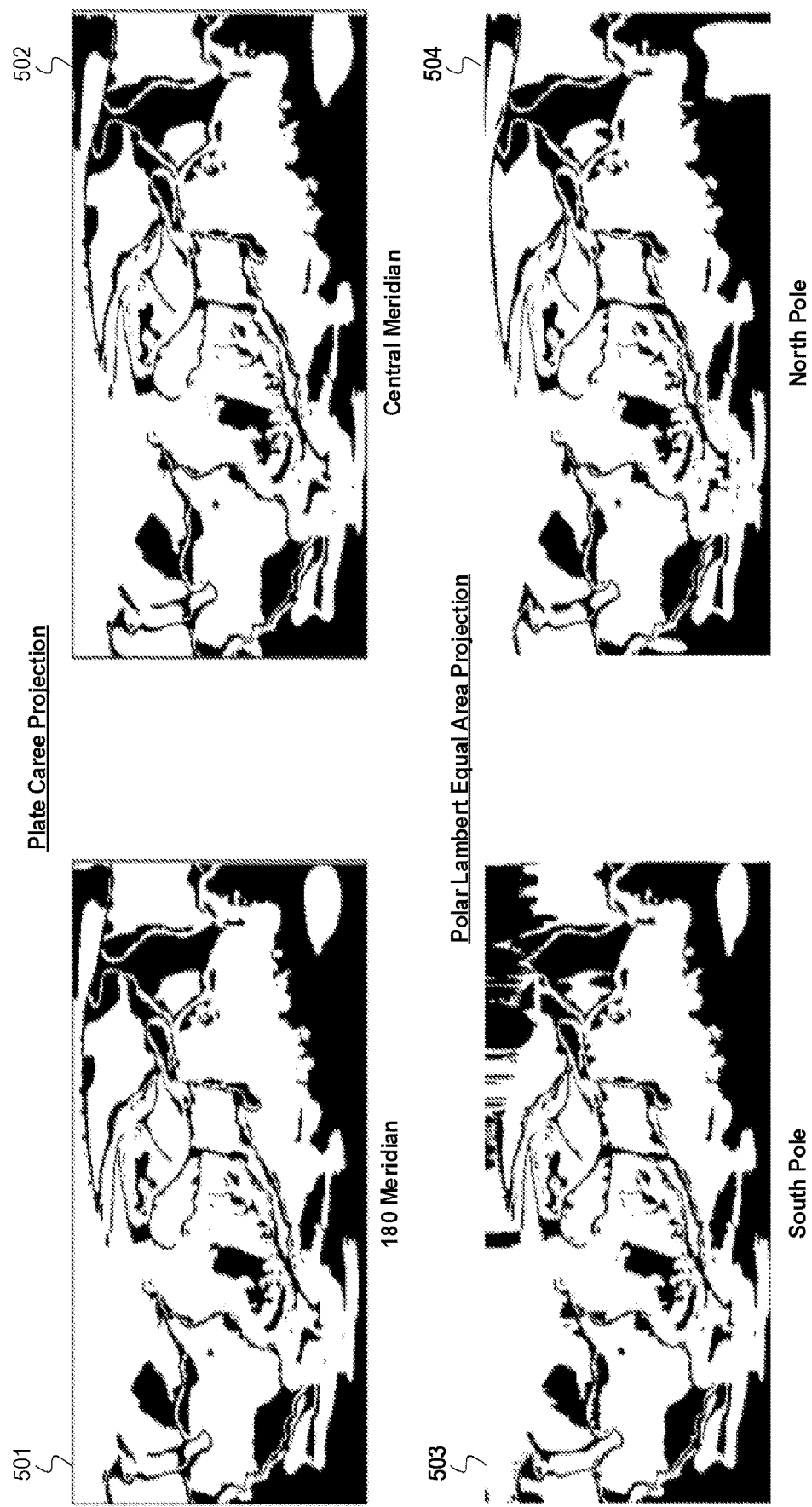
FIG. 5 is an illustration depicting example global data projections centered on various positions on the earth's surface.
Figure 6:
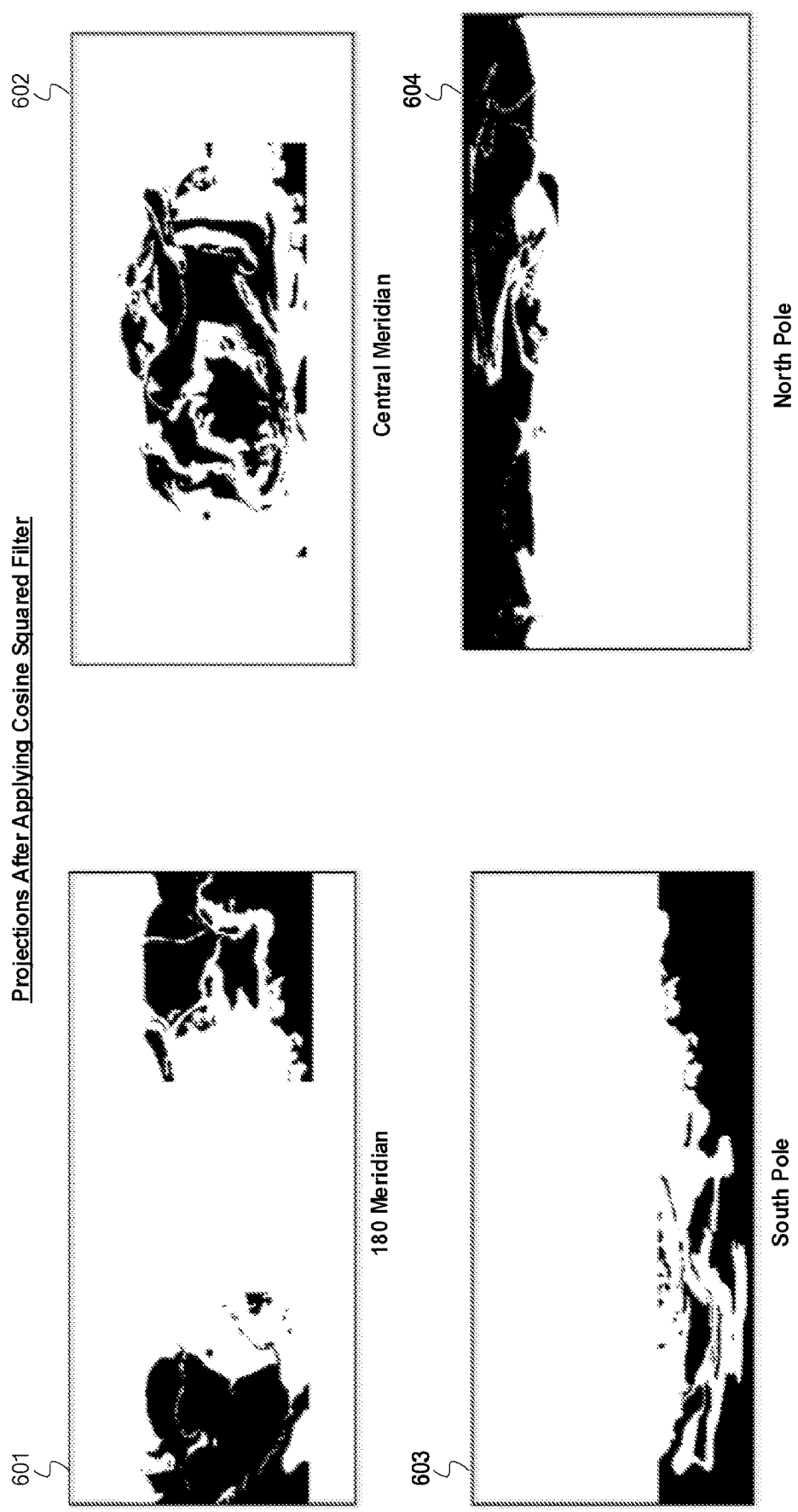
FIG. 6 is an illustration depicting example global data projections centered on various positions on the earth's surface after filtering for distortion.
Figure 7:
FIG. 7 is an illustration depicting example authalic global raster generated by merging filtered global data projections.

FIGS. 5-7 illustrate the process of generating projections, filtering projections, and merging projections to create a minimally distorted global raster as described above.

FIG. 5 is an illustration depicting example global data projections centered on various positions on the earth's surface. FIG. 5 depicts four rasters generated in different projections and displayed in a consistent global projection: a projection 501, a projection 502, a projection 503, and a projection 504. Each of the projections are centered on a different position or location on the earth's surface. Centering a projection refers to setting the origin of a PCS used by a projection to a point on the earth's surface, such as the north pole or a longitude and latitude coordinate. The projection 501 was generated using the WGS84 Plate Caree projection system centered on the 180 meridian. The projection 502 was also generated using the WGS84 Plate Caree projection system but was centered on the central meridian. The projection 503 was generated using the Polar Lambert Equal Area projection system centered on the south pole.

The projection 504 was also generated using the Polar Lambert Equal Area projection system but was centered on the north pole.

Centering the same projection systems on different positions of the earth's surface allows for correction of distortions at high latitudes and across date-lines. For example, in the projection 503, distortion can be seen in the upper right region of the image. In the projection 504 which was centered at a different position, there is no distortion in the upper right portion. Instead, distortion can be found in the lower right region of the projection 504. As shown in the subsequent figures, the distortion is filtered out allowing the final global raster to benefit from the distortion free portions of the projections 503 and 504.

FIG. 6 is an illustration depicting example global data projections centered on various positions on the earth's surface after filtering for distortion. FIG. 6 depicts the projections of FIG. 5 after application of a cosine squared filter. FIG. 6 depicts a filter projection 601, a filtered projection 602, a filtered projection 603, and a filtered projection 604. As described in relation to FIG. 5, different regions of the projections exhibited distortion. The distorted regions were identified, then filters were defined according to equation 1.2 and applied using equation 1.1 to remove those regions from the projections as depicted in FIG. 6.

FIG. 7 is an illustration depicting example authalic global raster generated by merging filtered global data projections. FIG. 7 a global raster 701 generated based on merging the filtered projections depicted in FIG. 6. The projections of FIG. 6 have been merged using a mosaicking algorithm. Additionally, the overlapping regions of the projections in FIG. 6 may have been removed, feathered, or filtered to generator a continuous, smooth image for the global raster 701, depending on the properties of the filters applied.

Variations

FIG. 1 is annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

The examples often refer to a generator. The generator is a construct used to refer to implementation of functionality for generating a minimally distorted global raster. This construct is utilized since numerous implementations are possible. A generator may be a computer, server, mobile device, a particular component or components of a machine (e.g., a particular circuit card enclosed in a housing with other circuit cards/boards), machine-executable program or programs (e.g., mapping or global information system software), firmware, a circuit card with circuitry configured and programmed with firmware for generating a minimally distorted global raster, etc. The term is used to efficiently explain content of the disclosure. The generator can also be referred to as a raster constructor, global data processor, etc. Although the examples refer to operations being performed by a generator, different entities can perform different operations. For instance, a dedicated co-processor or application specific integrated circuit can handle mosaicking of filtered projections.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 206-216 can be performed in parallel or concurrently for different projection systems of the plurality of projection systems. With respect to FIG. 2, block 204 is not necessary as projection systems to be used may be pre-configured. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
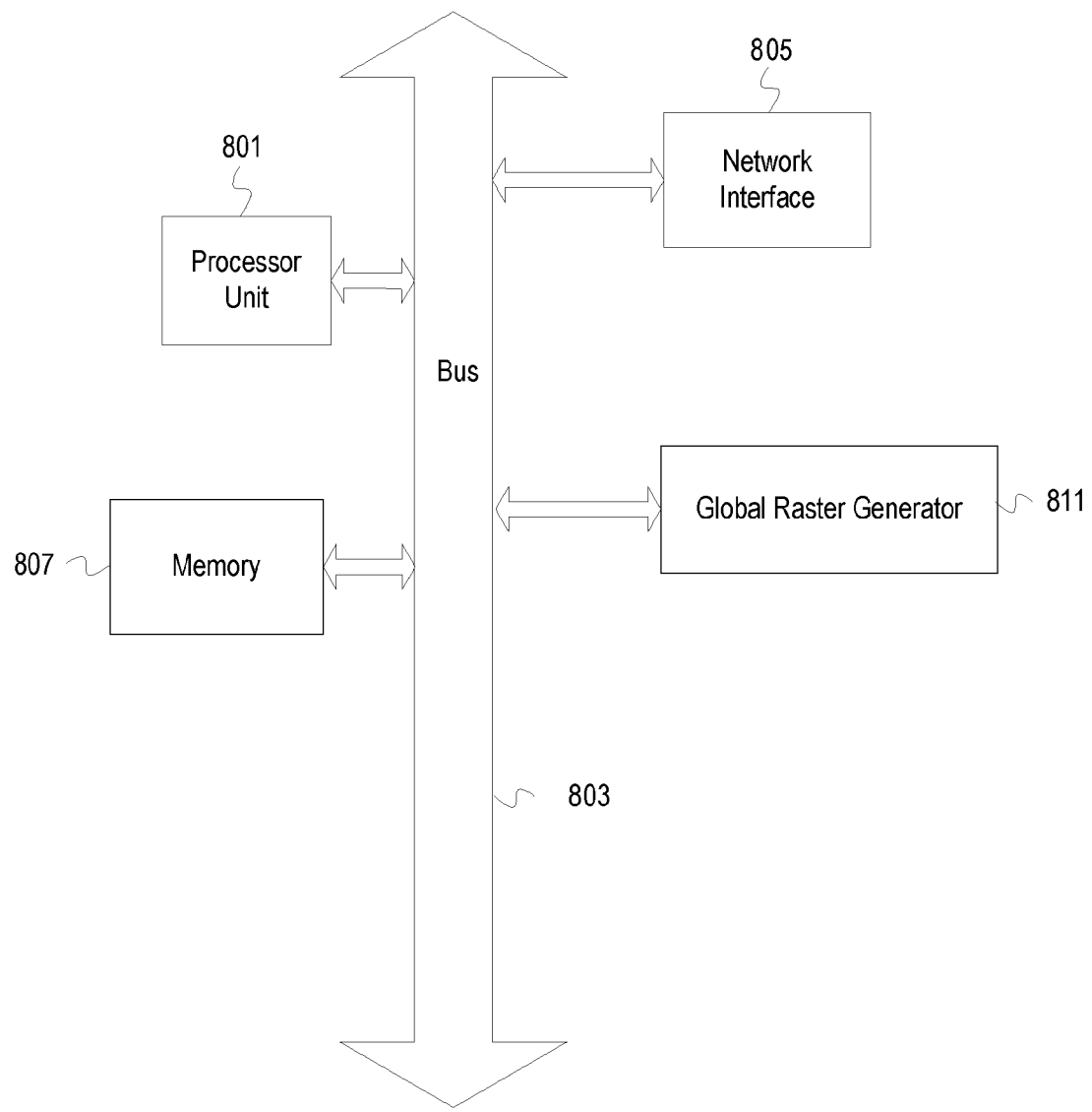
FIG. 8 depicts an example computer system with a global raster generator.

FIG. 8 depicts an example computer system with a global raster generator. The computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport® bus, InfiniBand® bus, NuBus, etc.) and a network interface 805 (e.g., a Fiber Channel interface, an Ethernet interface, an internet small computer system interface, SONET interface, wireless interface, etc.). The system also includes a global raster generator 811. The global raster generator 811 filters and combines a plurality of map projections based on global input data to generate a minimally distorted global raster. Any one of the previously described functionalities may be partially (or entirely) implemented in hardware and/or on the processor unit 801. For example, the functionality may be implemented with an application specific integrated circuit, in logic implemented in the processor unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

Example Embodiments

A. A method that includes selecting a plurality of projection systems based, at least in part, on geospatial data to be depicted in a global raster; projecting, for each projection system of the plurality of projection systems, the geospatial data onto a first projection in accordance with the projection system; identifying regions with minimal distortion in the first projections; and merging the regions with minimal distortion to create the global raster.

B. An apparatus that includes a processor and a machine-readable medium having program code executable by the processor. The program code executable by the processor to causes the apparatus to select a plurality of projection systems based, at least in part, on geospatial data to be depicted in a global raster; project, for each projection system of the plurality of projection systems, the geospatial data onto a first projection in accordance with the projection system; identify regions with minimal distortion in the first projections; and merge the regions with minimal distortion to create the global raster.

C. One or more non-transitory machine-readable media comprising program code, the program code to select a plurality of projection systems based, at least in part, on geospatial data to be depicted in a global raster; project, for each projection system of the plurality of projection systems, the geospatial data onto a first projection in accordance with the projection system; apply an interpolation algorithm to the first projections; transform each of the first projections in accordance with an indicated output projection system; identify regions with minimal distortion in the transformed first projections; and merge the regions with minimal distortion to create the global raster.

Each of the embodiments A, B, and C may have one or more of the following additional elements in any combination.

Element 1: wherein identifying regions with minimal distortion in the first projections comprises, for each position of a plurality of positions, determining, by a processor, first measurements for the position within the first projection and second measurements for the position within the geospatial data; comparing, by the processor, the first measurements to the second measurements; determining whether a difference between the first measurements and the second measurements exceeds a threshold; and based on determining that the difference between the first measurements and the second measurements does not exceed the threshold, indicating a region associated with the position as containing minimal distortion.

Element 2: wherein determining the first measurements for the position within the first projection and the second measurements for the position within the geospatial data comprises determining a first distance between the position and a reference position within a projected coordinate system of the first projection; and determining a second distance between the position and the reference position within a global coordinate system of the geospatial data; wherein determining whether the difference between the first measurements and the second measurements exceeds the threshold comprises determining whether a difference between the first distance and the second distance exceeds the threshold.

Element 3: wherein determining the first measurements for the position within the first projection and the second measurements for the position within the geospatial data comprises determining a first azimuth of the position with respect to a first cardinal direction within a projected coordinate system of the first projection; and determining a second azimuth of the position with respect to the first cardinal direction within a global coordinate system of the geospatial data; wherein determining whether the difference between the first measurements and the second measurements exceeds the threshold comprises determining whether a difference between the first azimuth and the second azimuth exceeds the threshold.

Element 4: further comprising applying an interpolation algorithm to the first projections.

Element 5: further comprising transforming each of the first projections in accordance with an indicated output projection system.

Element 6: wherein selecting the plurality of projection systems based, at least in part, on the geospatial data to be depicted in the global raster comprises determining a number of projection systems to select for the plurality of projections systems based, at least in part, on an indicated level of resolution for the global raster; determining properties of the geospatial data; and identifying projection systems compatible with the properties of the geospatial data.

Element 7: wherein merging the regions with minimal distortion to create the global raster comprises storing each of the regions in memory; analyzing, by a processor, the regions in the memory to identify their geographic boundaries; and applying, by the processor, a mosaicking algorithm to merge the regions in accordance with the geographic boundaries.

By way of non-limiting example, exemplary combinations applicable to A, B, and C include: Element 2 with Element 1 and Element 3 with Element 1.

While the aspects of the disclosure are described with reference to various implementations and exploitations, it will be understood that these aspects are illustrative and that the scope of the claims is not limited to them. In general, techniques for generating a minimally distorted global raster as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    selecting a plurality of projection systems based, at least in part, on geospatial data to be depicted in a global raster;
    projecting, for each projection system of the plurality of projection systems, the geospatial data onto a first projection in accordance with the projection system;
    performing a spatial operation, for each projection system, to update values in the first projections;
    re-projecting the updated values for each of the first projections onto a global projection;
    identifying regions with minimal distortion in the first projections and projecting the regions to the global projection; and
    merging the updated values for the regions with minimal distortion to create the global raster.

2. The method of claim 1, wherein identifying regions with minimal distortion in the first projections comprises:
    for each position of a plurality of positions,
        determining, by a processor, first measurements for the position within the first projections and second measurements for the position within the geospatial data;
        comparing, by the processor, the first measurements to the second measurements;
        determining whether a difference between the first measurements and the second measurements exceeds a threshold; and
        based on determining that the difference between the first measurements and the second measurements does not exceed the threshold, indicating a region associated with the position as containing minimal distortion.

3. The method of claim 2, wherein determining the first measurements for the position within the first projections and the second measurements for the position within the geospatial data comprises:
    determining a first distance between the position and a reference position within a projected coordinate system for each projection of the first projections; and
    determining a second distance between the position and the reference position within a global coordinate system of the geospatial data,
    wherein determining whether the difference between the first measurements and the second measurements exceeds the threshold comprises determining whether a difference between the first distance and the second distance exceeds the threshold.

4. The method of claim 2, wherein determining the first measurements for the position within the first projections and the second measurements for the position within the geospatial data comprises:
    determining a first azimuth of the position with respect to a first cardinal direction within a projected coordinate system for each projection of the first projections; and
    determining a second azimuth of the position with respect to the first cardinal direction within a global coordinate system of the geospatial data,
    wherein determining whether the difference between the first measurements and the second measurements exceeds the threshold comprises determining whether a difference between the first azimuth and the second azimuth exceeds the threshold.

5. The method of claim 1, wherein performing the spatial operation comprises applying an interpolation algorithm to the first projections.

6. The method of claim 1 further comprising transforming each of the first projections in accordance with an indicated output projection system.

7. The method of claim 1, wherein selecting the plurality of projection systems based, at least in part, on the geospatial data to be depicted in the global raster comprises:
    determining a number of projection systems to select for the plurality of projections systems based, at least in part, on an indicated level of resolution for the global raster;
    determining properties of the geospatial data; and
    identifying projection systems compatible with the properties of the geospatial data.

8. The method of claim 1, wherein merging the updated values for the regions with minimal distortion to create the global raster comprises:
    storing each of the regions in memory;
    analyzing, by a processor, the regions in the memory to identify their geographic boundaries; and applying, by the processor, a mosaicking algorithm to merge the regions in accordance with the geographic boundaries.

9. An apparatus comprising:
a processor; and
a machine-readable medium having program code executable by the processor to cause the apparatus to,
select a plurality of projection systems based, at least in part, on geospatial data to be depicted in a global raster;
project, for each projection system of the plurality of projection systems, the geospatial data onto a first projection in accordance with the projection system;
perform a spatial operation, for each projection system, to update values in the first projections;
re-project the updated values for each of the first projections onto a global projection;
identify regions with minimal distortion in the first projections and project the regions to the global projection; and
merge the updated values for the regions with minimal distortion to create the global raster.

10. The apparatus of claim 9, wherein the program code to identify regions with minimal distortion in the first projections comprises program code to:
for each position of a plurality of positions,
determine, by the processor, first measurements for the position within the first projections and second measurements for the position within the geospatial data;
compare, by the processor, the first measurements to the second measurements;
determine whether a difference between the first measurements and the second measurements exceeds a threshold; and
based on a determination that the difference between the first measurements and the second measurements does not exceed the threshold, indicate a region associated with the position as containing minimal distortion.

11. The apparatus of claim 10, wherein the program code executable by the processor to cause the apparatus to determine the first measurements for the position within the first projections and the second measurements for the position within the geospatial data comprises program code executable by the processor to cause the apparatus to:
determine a first distance between the position and a reference position within a projected coordinate system for each projection of the first projections; and
determine a second distance between the position and the reference position within a global coordinate system of the geospatial data,
wherein the program code executable by the processor to cause the apparatus to determine whether the difference between the first measurements and the second measurements exceeds the threshold comprises program code executable by the processor to cause the apparatus to determine whether a difference between the first distance and the second distance exceeds the threshold.

12. The apparatus of claim 10, wherein the program code executable by the processor to cause the apparatus to determine the first measurements for the position within the first projections and the second measurements for the position within the geospatial data comprises program code executable by the processor to cause the apparatus to:
determine a first azimuth of the position with respect to a first cardinal direction within a projected coordinate system for each projection of the first projections; and determine a second azimuth of the position with respect to the first cardinal direction within a global coordinate system of the geospatial data,
wherein the program code executable by the processor to cause the apparatus to determine whether the difference between the first measurements and the second measurements exceeds the threshold comprises program code executable by the processor to cause the apparatus to determine whether a difference between the first azimuth and the second azimuth exceeds the threshold.

13. The apparatus of claim 9, wherein the program code executable by the processor to cause the apparatus to perform the spatial operation comprises program code executable by the processor to cause the apparatus to apply an interpolation algorithm to the first projections.

14. The apparatus of claim 9 further comprising program code executable by the processor to cause the apparatus to transform each of the first projections in accordance with an indicated output projection system.

15. The apparatus of claim 9, wherein the program code executable by the processor to cause the apparatus to select the plurality of projection systems based, at least in part, on the geospatial data to be depicted in the global raster comprises program code to:
determine a number of projection systems to select for the plurality of projections systems based, at least in part, on an indicated level of resolution for the global raster;
determine properties of the geospatial data; and
identify projection systems compatible with the properties of the geospatial data.

16. The apparatus of claim 9, wherein the program code executable by the processor to cause the apparatus to merge the updated values for the regions with minimal distortion to create the global raster comprises:
analyze, by the processor, the regions to identify their geographic boundaries; and
apply, by the processor, a mosaicking algorithm to merge the regions in accordance with the geographic boundaries.

17. One or more non-transitory machine-readable media comprising program code, the program code to:
select a plurality of projection systems based, at least in part, on geospatial data to be depicted in a global raster;
project, for each projection system of the plurality of projection systems, the geospatial data onto a first projection in accordance with the projection system;
perform a spatial operation, for each projection system, to update values in the first projections;
re-project the updated values for each of the first projections onto a global projection;
identify regions with minimal distortion in the first projections and project the regions to the global projection; and
merge the updated values for the regions with minimal distortion to create the global raster.

18. The machine-readable media of claim 17, wherein the program code to identify regions with minimal distortion in the first projections comprises program code to:
for each position of a plurality of positions,
determine, by a processor, first measurements for the position within the first projection and second measurements for the position within the geospatial data;
compare, by the processor, the first measurements to the second measurements;
determine whether a difference between the first measurements and the second measurements exceeds a threshold; and based on a determination that the difference between the first measurements and the second measurements does not exceed the threshold, indicate a region associated with the position as containing minimal distortion.

19. The machine-readable media of claim 18, wherein the program code to determine the first measurements for the position within the first projections and the second measurements for the position within the geospatial data comprises program code to:

determine a first distance between the position and a reference position within a projected coordinate system for each projection of the first projections; and determine a second distance between the position and the reference position within a global coordinate system of the geospatial data, wherein the program code to determine whether the difference between the first measurements and the second measurements exceeds the threshold comprises program code to determine whether a difference between the first distance and the second distance exceeds the threshold.

20. The machine-readable media of claim 17, wherein the program code to select the plurality of projection systems based, at least in part, on the geospatial data to be depicted in the global raster comprises program code to:

determine a number of projection systems to select for the plurality of projections systems based, at least in part, on an indicated level of resolution for the global raster;

determine properties of the geospatial data; and identify projection systems compatible with the properties of the geospatial data.

\* \* \* \* \*